Inventor:
John S. Blowney,
by John W. Ralls
His Attorney.

United States Patent Office 2,705,902
Patented Apr. 12, 1955

2,705,902

LIGHT-BEAM PROJECTION INDICATING INSTRUMENT

John S. Blowney, Reading, Mass., assignor to General Electric Company, a New York corporation Application August 26, 1953, Serial No. 376,690

3 Claims. (Cl. 88—24)

My invention relates to improvements in light-beam instruments such as sensitive electrical instruments comprising a mirror galvanometer and a beam of light directed selectively to different positions along a scale by the galvanometer mirror. The value of the quantity measured, electric current for example, is indicated by the position of the light beam on the scale.

In such instruments commonly used heretofore, when the value of the quantity measured is outside the normal range of the instrument, the light beam does not reach the scale, and its position is not apparent. Frequently, it is not known whether the measured quantity has a value greater than that corresponding to the "high" or "positive" end of the scale, or a value smaller than that corresponding to the "low" or "negative" end of the scale. Dual sensitivity instruments have been provided having two sets of scale markings covering different ranges, with two beams respectively directed toward the two scales. But such dual-range instruments are relatively expensive, and have other disadvantages.

A principal object of my invention is to provide an improved light-beam instrument having simple, inexpensive means for indicating the off-scale location of the beam. Other objects and advantages will appear as the description proceeds.

Briefly stated, in accordance with one aspect of my invention, I provide an improved light-beam instrument having a pair of off-scale indicators. One of these indicators is substantially illuminated by the light beam only when the light beam is directed toward positions beyond one end of the scale, and the other is substantially illuminated only when the beam is directed toward positions beyond the other end of the scale.

My invention will be better understood from the following description taken in connection with the accompanying drawing, and its scope will be pointed out in the appended claims. In the drawing, Fig. 1 is a schematic front elevation of a light-beam instrument embodying principles of my invention;

Figure 1:
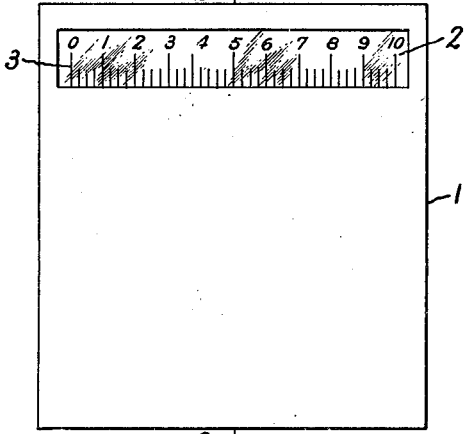

Referring to the drawing, the instrument comprises a case 1 having across its front an elongated translucent screen 2. A suitable scale 3 may be printed upon or otherwise associated with screen 2, as shown in Fig. 1, for example. In normal operation of the instrument, a beam of light is directed toward the back side of screen 2 and is visible from the front of the instrument as a spot on the screen at a position along the length of scale 3 corresponding to the value of a measured quantity.

Figure 2:
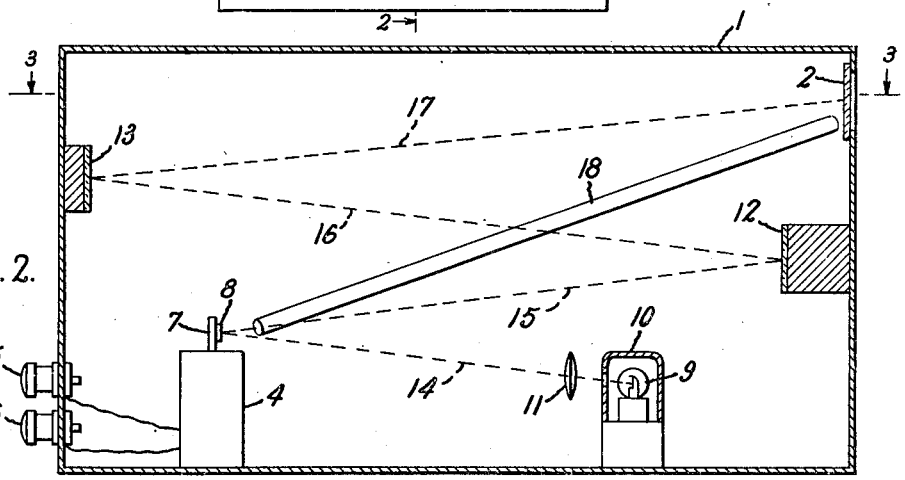
Fig. 2 is a section taken generally along the line 2—2 of Fig. 1.
Figure 3:
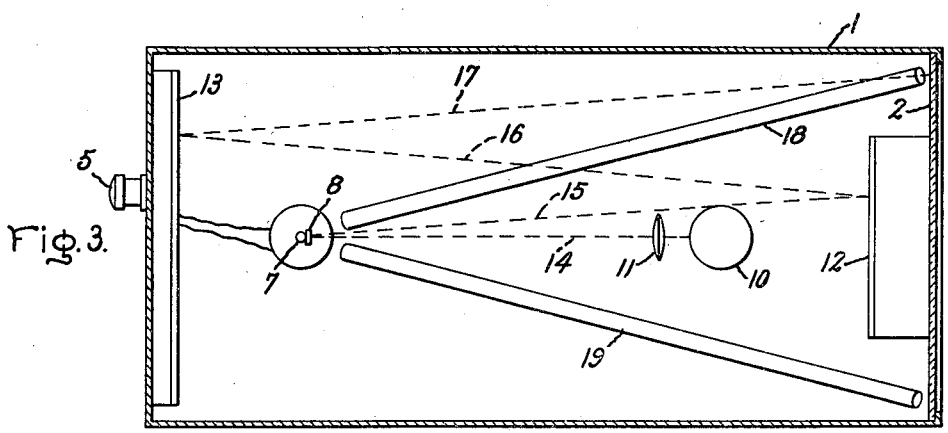
Fig. 3 is a section taken generally along the line 3—3 of Fig. 2.

The primary measuring device may be a sensitive galvanometer 4, for example, preferably located in the back portion of the case as shown in Figs. 2 and 3. Electrical connections to the galvanometer may be made through terminals 5 and 6 conveniently located on the back of the case. The galvanometer 4 has a rotatable element, schematically represented by the shaft 7, to which there is attached a small mirror 8. The angular position of element 7 and mirror 8 is a function of the electric current supplied to terminals 5 and 6. Since galvanometer 4 may be a conventional mirror galvanometer, or any other suitable device for rotating mirror 8 in accordance with a measured quantity, it will not be described further.

A beam of light is provided by a suitable light source, preferably located in the front portion of the case, which may comprise a small incandescent lamp 9 within a lamp housing 10. A lens 11 may be provided, if desired, to focus the beam. If desired, a hairline reticle, not shown, may be provided to produce a hairline image in the spot on the screen 2. The light beam is directed to mirror 8, from which it is reflected in a direction depending upon the angular position of the mirror.

To provide a long path for the reflected beam, for high sensitivity, in a relatively short instrument case, the beam is again reflected successively by mirrors 12 and 13 respectively attached to the front and back of the case, as shown. The beam then strikes the back of translucent screen 2, and produces a spot or image of the reticle which is visible from the front of the instrument. As mirror 8 rotates through its normal angular range, the light beam moves from one end of scale 3 to the other end of the scale, and indicates the amount of electric current applied to terminals 5 and 6. A typical path of the light beam is indicated by broken lines 14, 15, 16, and 17. If desired, means may be provided for adjusting the position of either mirror 12 or mirror 13, or both, to align the optical system or to adjust the zero position of the beam, or both. Thus far I have described a substantially conventional light-beam instrument.

A preferred form of my off-scale indicating means comprises a pair of light transmitting rods 18 and 19. I prefer to make these rods of Lucite, but satisfactory light-transmitting rods may be made of quartz or other material. For on-scale positions of the light beam, it will be noted that the beam passes between and over the rods 18 and 19, so that these rods do not in any way interfere with normal operation of the instrument.

The lower ends of rods 18 and 19 preferably are positioned substantially adjacent to the galvanometer mirror 8, as shown. These ends are spaced apart just far enough to permit the central or major portion of light beam 15 to pass between rods 18 and 19 over the normal measurement range of the instrument. Thus, for on-scale values, rods 18 and 19 are illuminated dimly if at all. Upon any off-scale rotation of mirror 8, however, a major portion of light beam 15 is intercepted by and substantially illuminates one or the other of the light transmitting rods.

The upper end of rod 18 is positioned adjacent to the lower right-hand corner of screen 2, and the upper end of rod 19 is positioned adjacent to the lower left-hand corner of screen 2. When off-scale values are encountered such that mirror 8 rotates beyond its normal range in one direction, the light beam illuminates brightly the lower end of rod 18. Rod 18 then transmits a substantial amount of light to the lower right-hand corner of screen 2, and thus produces a relatively bright spot on the screen which indicates off-scale values more positive than the value represented by the right-hand end of scale 3. When mirror 8 rotates in the opposite direction by an amount exceeding its normal range, the light beam illuminates brightly the lower end of rod 19, which then transmits a substantial amount of light to the lower left-hand corner of screen 2. This produces a relatively bright spot which indicates off-scale values more negative than the value represented by the left-hand end of scale 3. These off-scale indications are easily distinguished from the spot produced in normal operation of the instrument, by their size and brightness, and by their location on the screen below the level of the normal indicating spot. The off-scale indications greatly enhance the ease of operation of the instrument, since they provide a readily observed indication of the direction in which circuit values must be adjusted to obtain on-scale readings.

For clarity, supporting brackets for lens 11 and for rods 18 and 19 have not been shown in the drawing. Suitable brackets and other details of construction can be supplied readily by those skilled in the art.

It will be understood that my invention is not limited to the specific embodiment herein illustrated and described, and that the following claims are intended to cover all changes and modifications which do not depart from the true spirit and scope of the invention.

What I claim as new and desire to secure by Letters Patent of the United States is:

1. An instrument comprising a case, a galvanometer within the back portion of said case, said galvanometer having a rotatable element with a mirror attached thereto, means including a light source within the front portion of said case directing a beam of light onto said mirror from which said beam is reflected in a direction related to the angular position of said element, means receiving said reflected beam including an elongated translucent screen at the front of said case, whereby said light beam moves across the length of said screen as said element rotates through a predetermined angular range, a Lucite rod having an end adjacent to said mirror positioned to intercept a major portion of said reflected beam upon the rotation of said element beyond one end of said range, and another Lucite rod having an end adjacent to said mirror positioned to intercept a major portion of said reflected beam upon rotation of said element beyond the other end of said range, said rods having other ends adjacent to respective ends of said screen.

2. A light-beam instrument comprising an opaque housing having at least one light-transmitting aperture therethrough, a measuring instrument mechanism having an angularly movable element to which a mirror is attached within said casing, means directing a beam of light onto said mirror for reflection in directions related to the angular positions of said movable element, scale means positioned to intercept said reflected beam as said element moves through a predetermined angular range and to have said intercepted beam transmitted through said aperture for observation, and a light-transmitting rod having one end positioned adjacent said mirror to intercept a major portion of said reflected beam upon angular movement of said element beyond one end of said predetermined range and having another end disposed to be viewed from outside said casing, whereby brightening of said other rod end signals off-scale movement of said element beyond said one end of said predetermined range.

3. A light-beam instrument comprising an opaque housing having at least one light-transmitting aperture therethrough, a measuring instrument mechanism having an angularly movable element to which a mirror is attached within said casing, means directing a beam of light onto said mirror for reflection in directions related to angular positions of said element, scale means positioned to intercept said reflected beam as said mirror moves through a predetermined angular range and to have said intercepted beam transmitted through said aperture for observation from outside said casing, a first light-transmitting rod having one end positioned adjacent said mirror to intercept a major portion of said reflected beam upon angular movement of said element beyond one end of said predetermined range and having another end disposed to be viewed from outside said casing, and a second light-transmitting rod having one end positioned adjacent said mirror to intercept a major portion of said reflected beam upon angular movement of said element beyond the other end of said predetermined range and having another end disposed to be viewed from outside said casing, whereby brightening of one of said other ends of said rods signals off-scale movement of said element beyond the corresponding end of said predetermined range.

References Cited in the file of this patent
UNITED STATES PATENTS

| | | |
|---|---|---|
| 1,597,487 | St. Clair | Aug. 24, 1926 |
| 1,925,814 | Nicolson | Sept. 5, 1933 |
| 1,939,161 | Bestelmeyer | Dec. 12, 1933 |
| 1,977,027 | Vaughan | Oct. 16, 1934 |
| 1,981,999 | French | Nov. 27, 1934 |
| 2,256,595 | Metcalf | Sept. 23, 1941 |
| 2,286,737 | Hills | June 16, 1942 |
| 2,290,278 | Failla | July 21, 1942 |
| 2,305,775 | Hansen | Dec. 22, 1942 |
| 2,417,392 | Craig | Mar. 11, 1947 |
| 2,471,800 | Von Mulinen | May 31, 1949 |